UNITED STATES PATENT OFFICE.

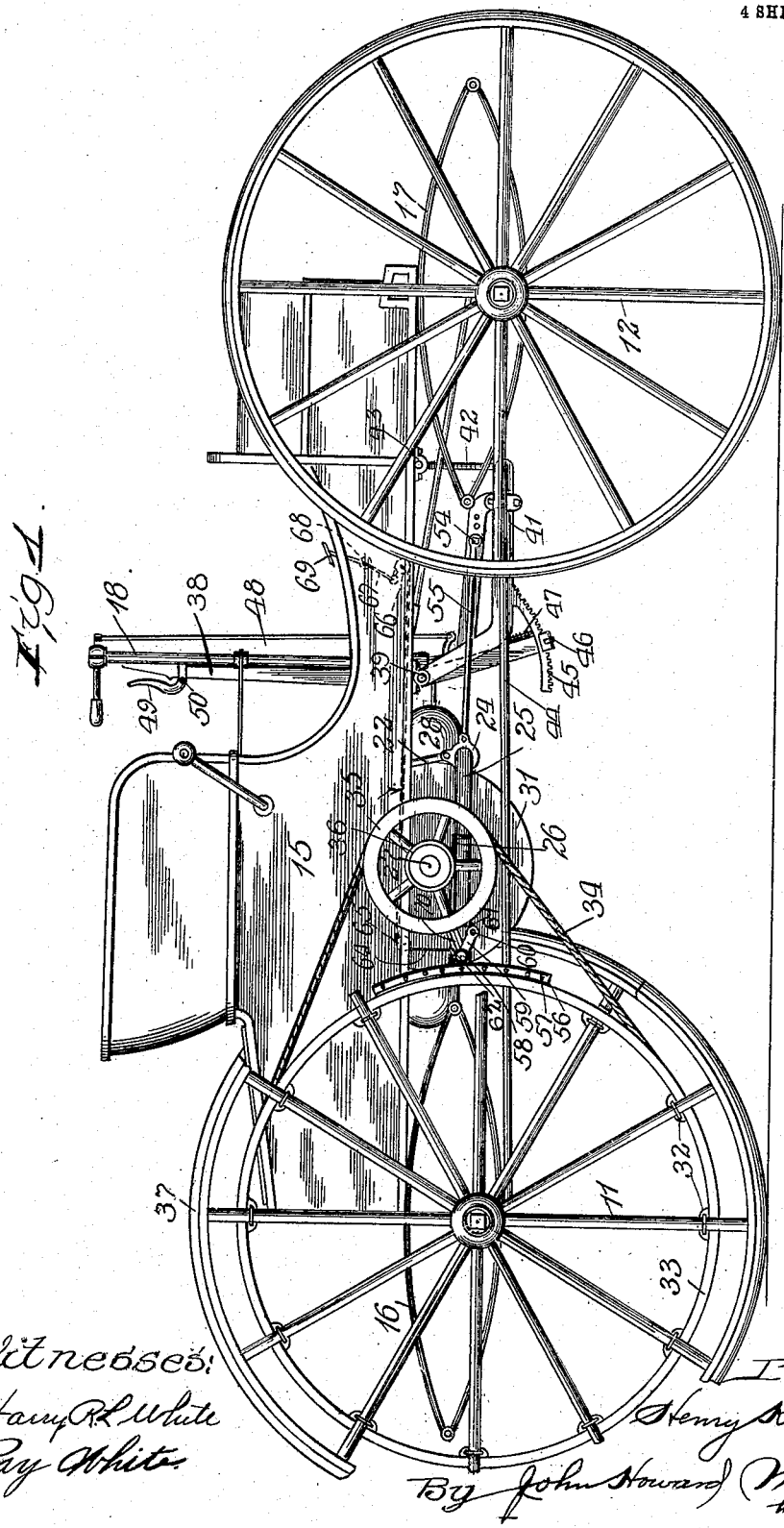

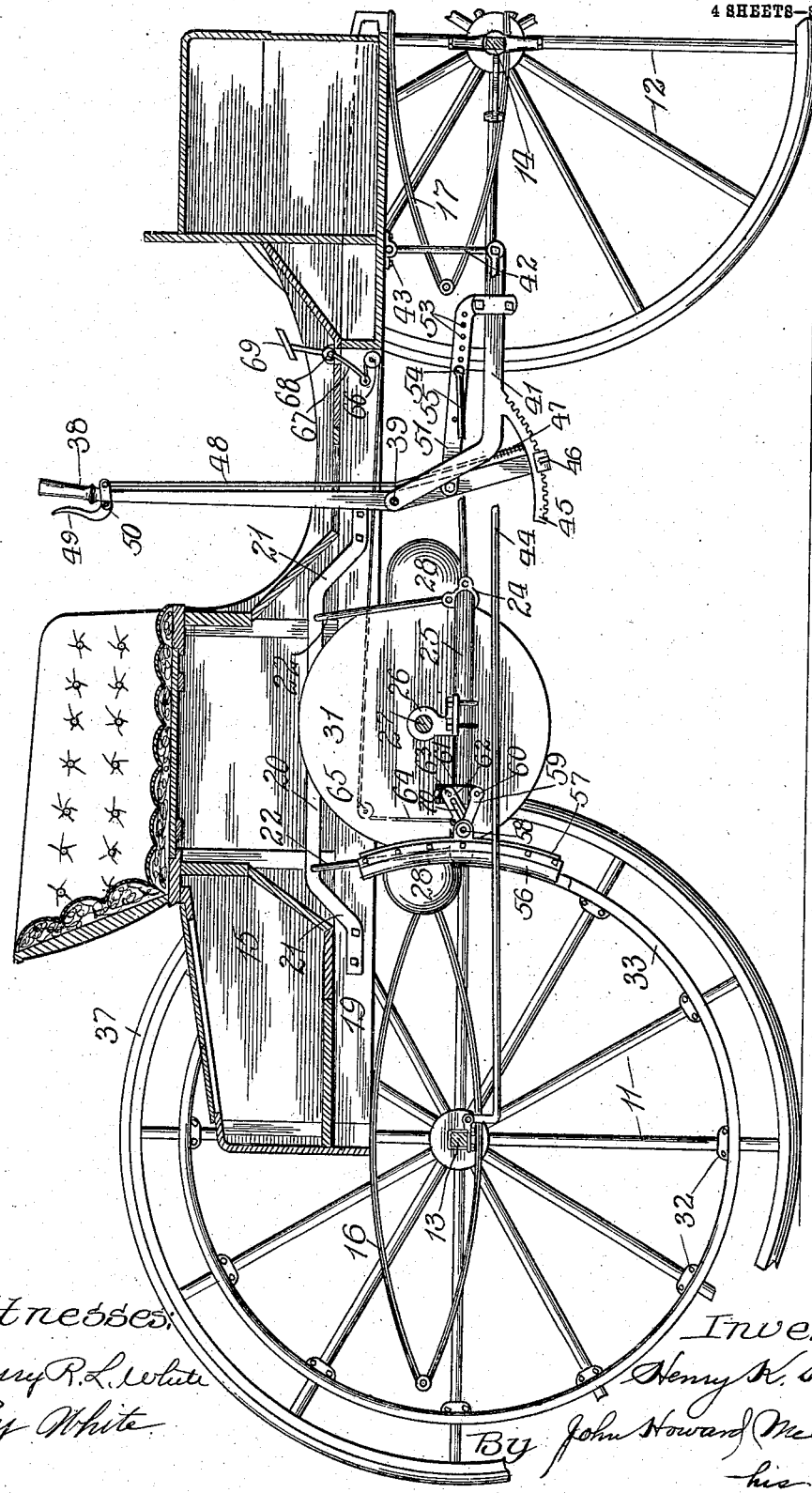

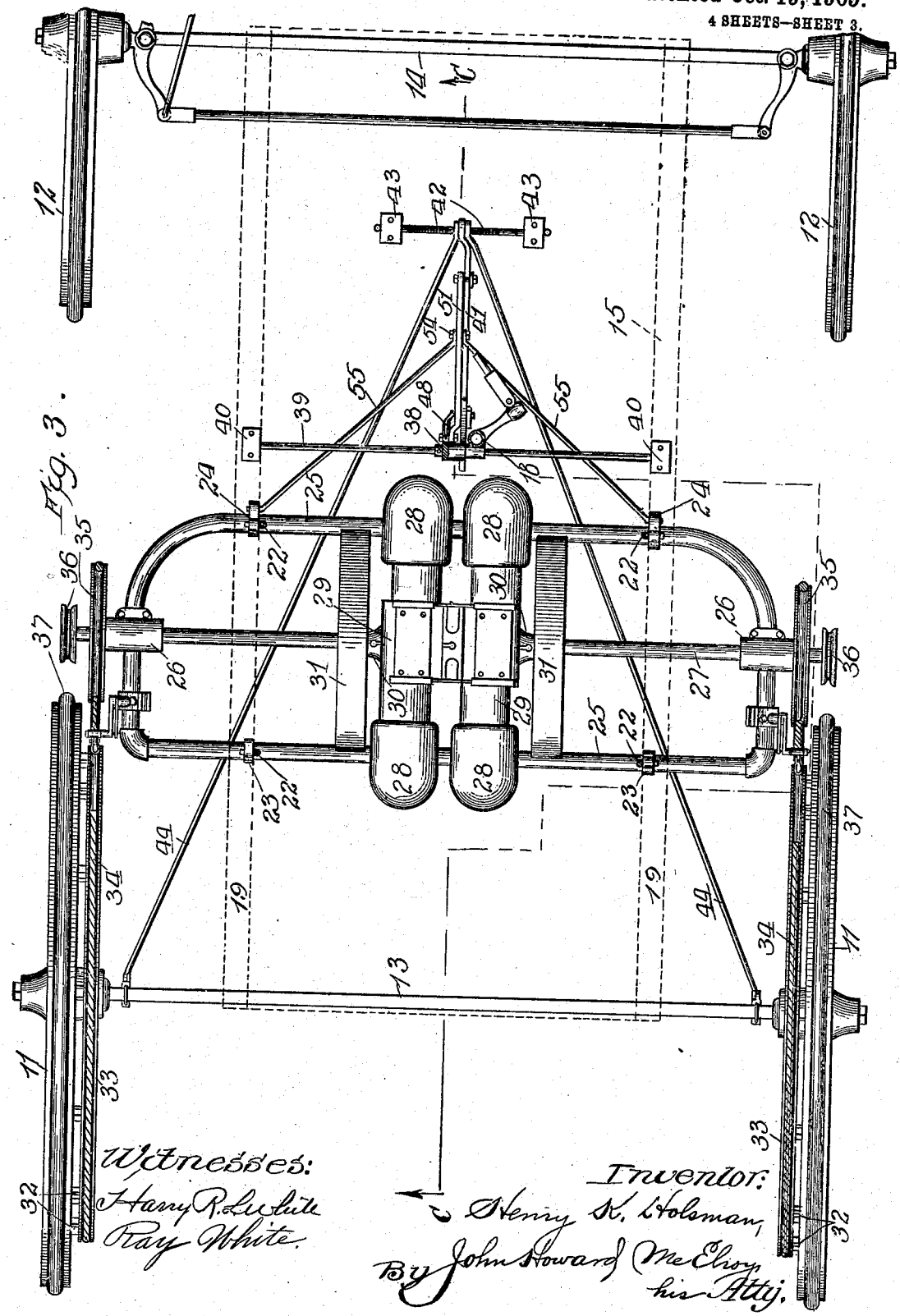

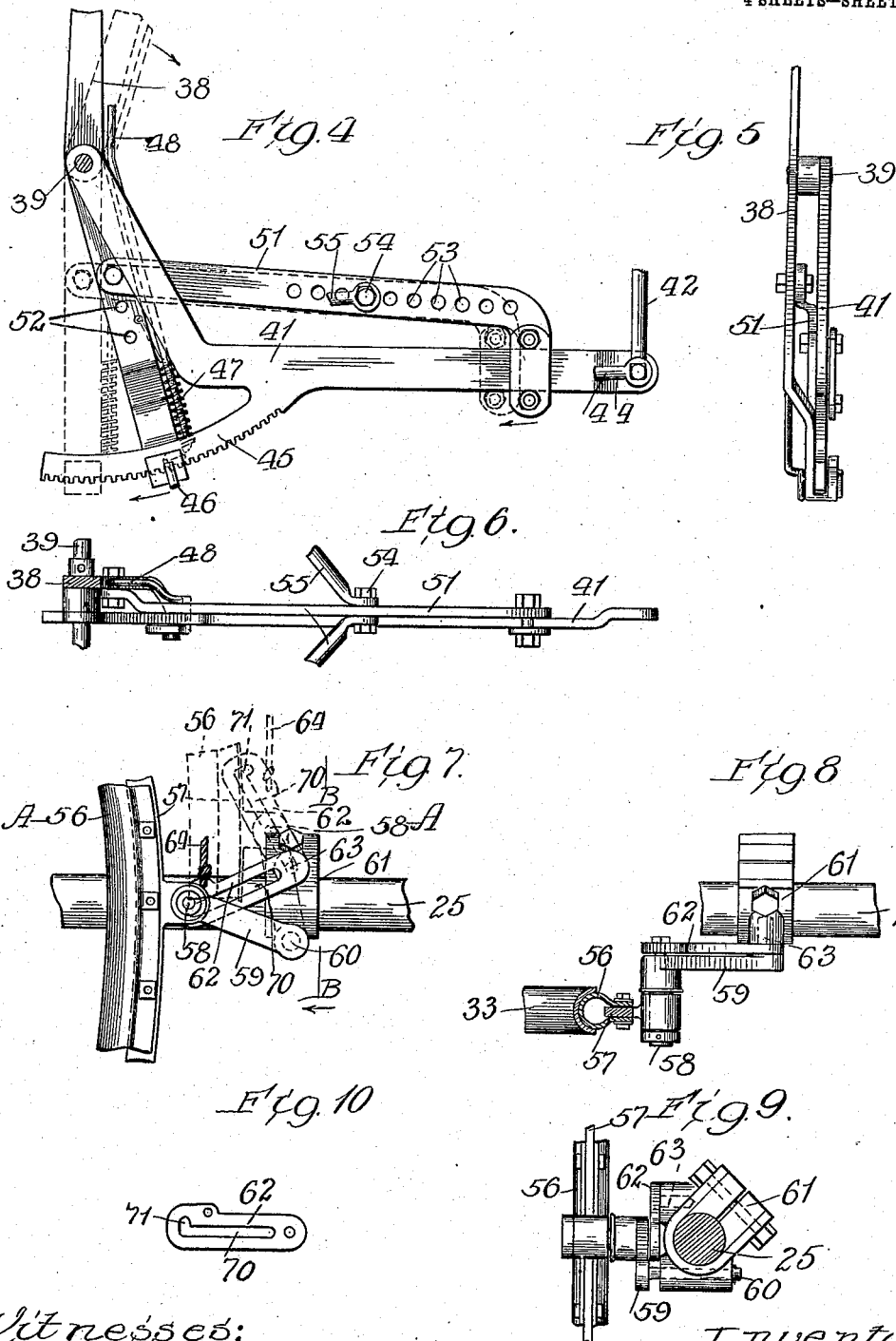

HENRY K. HOLSMAN, OF CHICAGO, ILLINOIS.

AUTOMOBILE.

937,211.  Specification of Letters Patent.  Patented Oct. 19, 1909.

Application filed January 18, 1907. Serial No. 352,848.

*To all whom it may concern:*

Be it known that I, HENRY K. HOLSMAN, a citizen of the United States, and resident of Chicago, in the county of Cook and State of Illinois, have invented certain new and useful Improvements in Automobiles, of which the following is a full, clear, and exact specification.

My invention is concerned with improvements in automobile driving mechanism of the general type shown in my Patent No. 697,720, dated April 15, 1902, and is mainly designed to simplify further the mechanism shown in that patent by making the engine itself movable, instead of stationary with a movable countershaft geared thereto.

Another object of my invention is to provide certain improvements in automobile construction and design, for the purpose of avoiding the employment of countershafts and transmission gears, and of providing a simple and economical direct drive between the motor and axle or driving wheel or wheels.

A further object of the invention is to provide certain improvements in automobile construction whereby a direct drive is provided between the engine motor shaft, and wherein the engine shaft is movable for reversing, driving and disconnecting the driving connection with the driven axle or wheels of the vehicle.

Finally, another object of the invention is the production of certain improvements in the arrangements and combinations of the elements, whereby an efficient, simple and economical automobile construction will be produced.

To illustrate my invention, I annex hereto four sheets of drawings, in which the same reference characters are used to designate identical parts in all the figures, of which,—

Figure 1 is a side elevation of an automobile containing my invention, with a portion of the rim of one of the driving wheels broken away; Fig. 2 is a central longitudinal section on a slightly enlarged scale; Fig. 3 is a top plan view of the running gears and the engine, with the carriage box or body removed; Fig. 4 is an enlarged detail in side elevation, showing the locking mechanism for holding the engine in any of its positions of adjustment; Fig. 5 is an end elevation of the mechanism shown in Fig. 4; Fig. 6 is a top plan view of the same mechanism; Fig. 7 is an enlarged detail, in side elevation, of a portion of the brake mechanism; Fig. 8 is a top plan view in section on the line A—A of Fig. 7; Fig. 9 is an end elevation of the brake mechanism, in section on the line B—B of Fig. 7; and Fig. 10 is a detail of the lifting and locking link of the brake mechanism.

I have shown my invention as applied to an automobile of the buggy type, in which the traction wheels 11 and the steering wheels 12 are mounted upon the axles 13 and 14. The rear end of the box or bed 15 of the vehicle is supported on the axle 13 by means of the interposed springs 16, and its front end is supported on the axle 14 by means of the interposed springs 17. The steering wheels 12 have their bearings pivotally mounted on the axle bar 14, and are provided with any suitable steering connections leading to the steering post 18. The present application is not concerned with the steering mechanism, and consequently no further reference will be made thereto, it being fully described and claimed in my Patent No. 897,368, granted September 1, 1908.

The box or bed 15 is provided with the side bars 19, to which are rigidly secured, on the inner sides thereof, the engine supporting bars or beams 20, which are preferably inclined upward at the portions 21, as shown, to secure the proper elevation for the upper ends of the supporting links 22 pivoted therein. The lower ends of these links 22 are pivotally secured in the collars 23 and 24, which are secured upon the rear and front sides, respectively, of the generally rectangular-shaped engine-supporting frame 25, which, as best shown in Fig. 3, is made up of tubing properly bent and jointed. This frame has the bearings 26 for the ends of the engine shaft 27, secured upon the upper side of its ends, and the cylinders 28 of the engine rest thereon, and are preferably secured thereto in any desired manner. I preferably employ a four-cylinder engine of the opposed type, in which each pair of opposed engines is provided with a common crank box 29 and bearings 30 for the shaft 27. The fly wheels 31 are preferably secured to the shaft immediately adjacent the outer bearings 30, the engine proper being entirely beneath and protected by the body of the vehicle.

The traction wheels 11 have secured thereon by any suitable means, such as the clips 32, the pulley rim 33, which is adapted to receive the pulley ropes 34, which also run over the driving pulley wheels 35, which are, of course, of smaller diameter, and are secured on the shaft 27 just outside of the bearings 26. When the engine is moved into its forward position, shown in Fig. 2, the driving ropes 34 are tautened so that the rotation of the engine-shaft 27 in a forward direction drives the vehicle forward. When it is swung back to the other extreme position, the grooved reversing disks 36 secured on the outer ends of the engine-shaft 27 engage the tires 37 of the traction wheels 11, and serve to reverse the direction of movement of the vehicle at a much slower rate, by direct frictional contact. When the engine is in an intermediate position, the driving ropes 34 are not sufficiently taut to drive the vehicle, and the shaft 27 rotates idly. To adjust and secure the engine-shaft in any of these three positions, I employ the operating lever 38, which is preferably rigidly secured to the rock shaft 39 extending transversely across the machine between the bars 19 and journaled in the bearings 40 secured on the under sides thereof, as best seen in Fig. 3, although it will be understood that the shaft 39 may be merely a bearing rod secured in the bearings 40 with the lever 38 pivoted thereon.

A segment supporting bar 41, best shown in Fig. 4, has its upper end loosely mounted on the rock shaft 39, and its forward end is mounted at a lower level upon the preferably V-shaped link rod 42, the extended upper end of which is journaled in the bearings 43 secured on the bottom of the box, as shown in Figs. 2 and 3. The distance rods 44 extend from the rear axle 13 diagonally to the lower end of the link 42, to which they are secured. As the link rod 42 is pivoted, and the long rod or shaft 39 can spring at its center backward or forward by these connections, I have a sufficiently flexible connection and support for the moving parts connected both to the running gears proper and the bed or body, which is yieldingly supported thereon through the medium of the springs 16 and 17, to accommodate the very considerable up and down, the lesser sidewise, and the still less horizontal movement of the body relative to the running gears.

The bar 41 has formed on the under side thereof the toothed segment 45, the teeth of which are adapted to be engaged by the detent 46 normally held yieldingly in engagement therewith by the helically-coiled contractile-spring 47 surrounding the lower portion thereof and having its other end secured upon the lower end of the lever 38, thus locking the lever and making a rigid connection of the engine and axle, while leaving the axle and body flexible relative to each other. The link 48, to the lower end of which the detent 46 is secured, extends upward adjacent the handle 38 to the thumb lever 49 pivoted to the handle 38 at 50, so that as the lever 49 is moved toward the handle 38, the link 48 is thrust downward to release the detent 46 from the teeth of the segment 45, so that the lever can be swung to any desired position, in which it will be held by the detent as soon as the pressure is released from the handle 49. For link connections between the engine frame and the lever 38, I preferably pivotally secure to the lower arm of the latter the link bar 51, and I preferably provide a plurality of apertures 52 in the lower arm of the lever 38 in order to adjust the link bar 51 as may be necessary. The link bar 51, instead of being directly connected to the engine frame, is also preferably provided with a plurality of apertures 53, through which a bolt 54 is passed to secure the diagonal link rods 55 thereto, the other ends of which are secured in bearings formed on the collars 24, so that as the lever 38 is swung, the engine is moved backward or forward, as the case may be. It will thus be seen that the mechanism described constitutes manually-controlled engine shifting and locking means, by which the movement of the engine for starting, stopping and reversing the vehicle is readily controlled.

In connection with the apparatus thus far described, I preferably provide a brake moved with the engine-shaft bearings so as to be brought into engagement with the annular braking surface on the traction wheels when the engine is moved to release the tension of the ropes 34 to stop the vehicle. I preferably utilize the space on the rim 33 unoccupied by the rope 34 as this annular braking surface, and provide the brake shoe 56, which has the proper radius of curvature to and curve in cross section to coöperate with the rim. This shoe is secured upon the bar 57, which is pivoted at 58 upon the supporting link 59 pivoted at 60 upon the collar 61 secured upon the end of the engine supporting frame 25. It is also normally held rigid by the link 62, shown in Fig. 10, which is pivoted at 63 to the same collar 61, and is provided with the cord 64 running over the sheaves 65 and 66 to the arm 67 secured on the rock shaft 68 extending transversely of the bed, and having the pedal lever 69 extending upward into a position where it can be readily operated by the foot when it is desired to back the vehicle, which is the only time this apparatus is called into play. The link 62 has the longitudinal slot 70 therein terminating with the transverse recess, which, engaging with the pivot rod 58, serves to normally lock the brake shoe in position to firmly engage with the rim 33 when the engine is moved to stopping position. If the pedal lever 69 be operated, it will be apparent that the cord 64 running over the sheaves will pull up the lever 62 to the dotted-line position of Fig. 7, and the first effect of this swinging movement of the lever is to unlock the brake as soon as the pin 58 is disengaged from the recess 71, and its continued movement will draw the brake shoe away from the rim 33 in a manner which will be readily apparent. It will be understood that the brake shoe might be otherwise supported, provided it had the same relative movement to the wheels.

While I have herein shown and described my novel brake mechanism employed in connection with this automobile, I do not herein claim the same, as that invention is made the subject of my divisional application No. 475,341, filed February 1, 1909, for braking mechanism for automobiles.

While I have shown and described my invention in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a motor-vehicle, in combination, a frame having engine-supporting beams, a shiftable engine arranged beneath and movably supported from said beams, a transverse engine-shaft carried by and shiftable with said engine, manually-controlled engine shifting and locking means, a vehicle traction wheel, and an endless friction driving belt between said shaft and said wheel, and controlled by the position of said engine, substantially as described.

2. In a motor-vehicle, in combination, a frame, traction wheels, a shiftable engine pivotally supported on the frame about centrally between said wheels, and provided with and carrying a transverse engine-shaft having reverse-drive friction-surfaces opposite said wheels, endless forward-drive friction-belts between said shaft and said wheels, and means for swinging said engine and locking the same in the desired position.

3. In a motor-vehicle, in combination, a frame, traction wheels, a shiftable engine movably supported by said frame and comprising an engine-frame, an engine-shaft mounted in and movable with said engine-frame and arranged transversely of the vehicle-frame and provided with annular friction-surfaces adjacent said wheels and adapted by shifting the engine to be brought into operative engagement with said wheels, direct endless friction drive-belts between said shaft and said wheels and tightened and loosened by shifting said engine, and manually-controlled engine shifting and locking mechanism for throwing said belts into and out of operative connection and for throwing said friction-surfaces into and out of operative position.

4. In a motor-vehicle, in combination, a frame, traction wheels, a shiftable engine movably supported on the frame about centrally between said wheels, and provided with and carrying a transverse engine-shaft having reverse-drive friction-surfaces opposite said wheels, direct endless forward-drive friction-belts between said shaft and said wheels, and means for moving said engine and locking the same in the desired position, for the purposes substantially as described.

5. In a motor-vehicle, in combination, a frame substantially stationary relative to the traction wheel, a traction wheel, a shiftable engine, a movable frame supporting the engine from the main frame, the transverse engine-shaft carried by and shiftable with the engine, direct forward and reverse drive friction transmission means between said shaft and said wheel, and means for shifting the engine and locking the same in the desired position, for controlling said means.

6. In a motor-vehicle, in combination, a frame, traction wheels, a shiftable engine movably supported in the frame about midway between said wheels, the engine-shaft carried by and shifting with the engine and projecting in opposite directions from the engine and approximately into the planes of said wheels, supports for the end portions of said shaft movably carried by the frame, direct forward and reverse friction transmission driving means between said shaft and said wheels and thrown into and out of operative connection by shifting said engine, and manually-controlled means for shifting said engine and locking the same in the desired position, comprising push and pull links to said engine and to the end portions of said shaft.

7. In a motor-vehicle, in combination, a frame having engine-supporting beams, a shiftable engine arranged adjacent and movably supported by said beams, a transverse engine-shaft driven and carried by said engine and shiftable therewith, a vehicle traction-wheel, a direct endless friction drive-belt between said shaft and said wheel, said shaft provided with an annular friction-surface opposite said wheel and adapted to be brought into operative engagement therewith when said engine is shifted to throw said belt out of operative position by slackening the same, and manually-controlled means for shifting said engine.

8. In combination, a frame, comprising engine-supporting beams, a vehicle traction-wheel, a shiftable engine movably supported by said beams and comprising a crank-box rigid with said engine, an engine-shaft mounted in said crank-box and shifting with the engine and provided with a surface opposite said wheel, an endless friction drive-belt between said shaft and wheel, and means to shift the engine to move said shaft toward and from said wheel and thereby slacken the belt and bring said surface into engagement with the wheel or tighten the belt and move said surface from the wheel.

9. In combination, in a motor-vehicle, a frame, vehicle traction-wheels, a shiftable engine movably supported in the frame and arranged about midway between said wheels, the engine-shaft carried by said engine and shiftable therewith toward and from said wheels and provided with surfaces arranged opposite the wheels and adapted by shifting the engine to be brought into operative engagement with said wheels, endless friction drive-belts between said shaft and said wheels and adapted to be slackened when said engine is shifted to bring said surfaces into engagement with said wheels, and means for shifting said engine and for locking the same in forward-drive position, non-drive position, and reverse-drive position.

10. In combination, in a motor-vehicle, a frame, vehicle traction-wheels, a shiftable engine movably supported by the frame and provided with and driving an engine-shaft having annular friction-surfaces opposite the wheels, and being shiftable with the engine, endless friction drive-belts between said shaft and said wheels, and manually-controlled means for shifting the engine to tighten or slacken said belts and to move said surfaces from or into direct operative engagement with said wheels, and for locking the engine in forward-drive position, non-drive position and reverse-drive position.

11. In a motor-vehicle, in combination, a frame, traction-wheels, a shiftable engine movably supported on the frame and comprising an engine-frame, the engine-shaft mounted in and carried by said frame and shifting with the engine toward and from said wheels, endless flexible driving-belts between and directly connecting said shaft and said wheels, and manually-controlled engine shifting and locking means for shifting said engine to tighten and loosen said belts, substantially as described.

12. In a motor-vehicle, in combination, a frame, traction-wheels, a movable engine having means for movably supporting the same in the frame and provided with and carrying a crank-box, an engine-shaft arranged transversely of the vehicle and mounted in and carried by said crank-box, direct friction driving transmission means between said shaft and said wheels controlled by the position of said engine, friction reverse-drive means carried by said shaft for direct frictional driving engagement with said wheels, and a manually-operated lever and locking mechanism comprising a push and pull link connection to said crank-box for shifting the position of said engine to forward-drive position, non-drive position, or reverse-drive position.

13. A motor-vehicle provided with a movably-mounted engine having its engine-shaft directly coupled thereto and driven thereby and shiftable therewith, means to shift said engine to and from and lock the same in forward-drive position, non-drive position and reverse-drive position, direct forward-drive friction transmission means between said shaft and the vehicle traction-wheels, and direct frictional reverse-drive means on said shaft to engage said wheels.

14. In an automobile, the combination with the running gears, comprising a traction wheel, of the concentric pulley-wheel for driving the traction wheel, the engine movably mounted upon the running gears, a driving pulley secured on the engine shaft, a belt or rope connecting the pulleys, and means for moving the engine and securing it in driving or non-driving position, depending on whether or not the belt is tightened.

15. In an automobile, the combination with the running gears, comprising a traction wheel, of the concentric pulley-wheel for driving the traction wheel, the engine movably mounted upon the running gears, a driving pulley secured on the engine-shaft in the plane of the pulley-wheel, a reversing disk also secured thereon in the plane of the traction-wheel, a belt or rope connecting the pulleys, and means for moving the engine and securing it in driving, non-driving or reversing position, depending upon whether or not the belt is tightened or loose, with the reversed pulley out of or in engagement with the periphery of the traction wheel.

16. In an automobile, the combination with the running gears, comprising a traction wheel, of the pulley-wheel rim secured to the spokes of the traction wheel, the engine movably mounted upon the running gears, a driving pulley secured on the engine shaft, a belt or rope connecting the pulleys, and means for moving the engine and securing it in driving or non-driving position, depending upon whether or not the belt is tightened.

17. In an automobile, the combination with the running gears, comprising a traction wheel, of the pulley-wheel rim secured to the spokes of the traction wheel, the engine movably mounted upon the running gears, a driving pulley secured on the engine shaft in the plane of the rim, a reversing disk secured to the engine-shaft in the plane of the periphery of the traction wheel, a belt or rope connecting the pulleys, and means for moving the engine and securing it in driving, non-driving or reversing position, depending upon whether or not the belt is tightened or loose, with the reversing disk out of or in engagement with the periphery of the traction wheel.

18. In an automobile, the combination with the running gears, comprising a traction wheel, of the concentric pulley-wheel for driving the traction wheel, the carriage-body supported on the running gears by springs, a swinging frame pivoted by links to the carriage-body, the engine mounted upon the swinging frame, a driving pulley secured on the engine-shaft, a belt or rope connecting the pulleys, and means for moving the engine-supporting frame and securing it in driving or non-driving position, depending upon whether or not the belt is tightened.

19. In an automobile, the combination with the running gears comprising a traction wheel, of the concentric pulley-wheel for driving the traction wheel, the carriage-body supported on the running gears by springs, a swinging frame pivoted by links to the carriage-body, the engine mounted upon the swinging frame, a driving pulley secured on the engine-shaft, a belt or rope connecting the pulleys, and means for moving the engine-supporting frame and securing it in driving or non-driving position, depending upon whether or not the belt is tightened, and comprising a stationary toothed segment supported by the carriage-body and running gears, an operating lever having a plunger coöperating with the segment, and link connections between the lever and the engine-supporting frame.

20. In an automobile, the combination with the running gears comprising a traction wheel, of the concentric pulley-wheel for driving the traction wheel, the carriage-body supported on the running gears by springs, a swinging frame pivoted by links to the carriage-body, the engine mounted upon the swinging frame, a driving pulley secured on the engine-shaft, a belt or rope connecting the pulleys, and means for moving the engine-supporting frame and securing it in driving or non-driving position, depending upon whether or not the belt is tightened, comprising a stationary toothed segment supported by the carriage-body and running gears, an operating lever having a plunger coöperating with the segment, and adjustable link connections between the lever and the engine-supporting frame.

21. In an automobile, the combination with the running gears comprising a traction wheel, of the concentric pulley-wheel for driving the traction wheel, the carriage-body supported upon the running gears by springs, the swinging engine-supporting frame pivoted by links to the carriage-body, a driving pulley secured on the engine-shaft in the plane of the pulley wheel, a reversing disk also secured to the engine-shaft in the plane of the traction wheel, a belt or rope connecting the pulleys, and means for moving the engine and securing it in driving, non-driving or reversing position, depending upon whether or not the belt is tightened, or loose, with the reversing disk out or in engagement with the periphery of the traction wheel.

22. In an automobile, the combination with the running gears comprising a traction wheel, of the concentric pulley-wheel for driving the traction wheel, the carriage-body supported upon the running gears by springs, the swinging engine-supporting frame pivoted by links to the carriage-body, a driving pulley secured on the engine-shaft in the plane of the pulley-wheel, a reversing disk also secured to the engine-shaft in the plane of the traction wheel, a belt or rope connecting the pulleys, and means for moving the engine and securing it in driving, non-driving or reversing position, depending upon whether or not the belt is tightened or loose, with the reversed pulley out of or in engagement with the periphery of the traction wheel, comprising a stationary toothed segment supported by the carriage-body and running gears, an operating lever having a plunger coöperating with the segment, and link connections between the lever and the engine-supporting frame.

23. In a motor vehicle, the combination with the running gears, comprising the distance bars rigidly secured to the rear axle, of the body upon the running gears, springs interposed between said body and running gears, the suspension for the front end of the distance bars from the body, and the engine-controlling apparatus partly supported by the distance rod and partly by the body, and capable of some movement relative to both.

24. In a motor vehicle, the combination with the running gears, comprising the distance bars rigidly secured to the rear axle, of the body upon the running gears, springs interposed between said body and running gears, the suspension for the front end of the distance bars from the body, and the engine-controlling apparatus partly supported by the distance rod and partly by the body, and capable of some movement relative to both, comprising the elastic shaft extending transversely of the body and supported thereby at its ends, said engine-controlling apparatus being mounted on said shaft.

25. In a motor vehicle, the combination with the running gears, comprising the distance bars rigidly secured to the rear axle, of the body upon the running gears, springs interposed between said body and running gears, the suspension for the front end of the distance bars, the elastic shaft extending transversely of the bed and supported thereby at its ends, the engine-controlling lever mounted on the shaft, the connecting bar secured to the distance rods and to the elastic shaft, and connections between the lever and the movable element controlling the driving of the car.

26. In a motor vehicle, the combination with the running gears, comprising the distance bars rigidly secured to the rear axle, of the body upon the running gears, springs interposed between said body and running gears, the suspension for the front end of the distance bars, the elastic shaft extending transversely of the bed and supported thereby at its ends, the engine-controlling lever mounted on the shaft, the connecting bar secured to the distance rods and to the elastic shaft, and a link connection between the lever and the movable element controlling the driving of the car sliding on the connecting bar.

27. In a motor vehicle, the combination with the running gears, comprising the distance bars rigidly secured to the rear axle, of the body upon the running gears, springs interposed between said body and running gears, the suspension for the front end of the distance bars, the elastic shaft extending transversely of the bed and supported thereby at its ends, the engine-controlling lever mounted on the shaft, the connecting bar secured to the distance rods and to the elastic shaft, connections between the lever and the movable element controlling the driving of the car, a segment on the connecting bar, and a latch on the lever for securing it in any position of adjustment.

28. In a device of the class described, the combination with the running gears, the traction wheel, the springs on the running gears, the body upon the springs, the motor mechanism, driving connections between the motor and the traction wheel, driving-connections controlling-mechanism carried by the body and movable relative to the running gears, and means for locking the controlling mechanism to the running gears in any position of adjustment.

29. In a device of the class described, the combination with the running gears, the traction wheel, the springs on the running gears, the body upon the springs, the motor mechanism, driving connections between the motor and the traction wheel, driving-connections controlling mechanism carried by the body capable of yielding relatively thereto to accommodate the movement of the body relative to the running gears, and itself movable relative to the running gears, and means for locking the controlling mechanism to the running gears in any position or adjustment.

30. In a device of the class described, the combination with the running gears comprising the traction wheel, and the springs on said running gears, of the body upon the springs, the motor mechanism, driving connections between the motor and the traction wheel, and driving-connections controlling mechanism partly supported by the running gears and partly by the body, and capable of some movement relative to both.

31. In a motor vehicle, the combination of a frame, a traction wheel mounted on a stationary support, hanging means connected to and depending from the frame and arranged to swing fore and aft, a motor carried by said hanging means and arranged to swing as a whole fore and aft therewith, a driving connection intermediate the motor and the traction wheel, and means connected with the motor for enabling the driver of the vehicle to swing the motor forward and hold the same against swinging rearward.

In witness whereof, I have hereunto set my hand and affixed my seal, this 12th day of January, A. D. 1907.

HENRY K. HOLSMAN. [L. S.]

Witnesses:
  JOHN HOWARD McELROY,
  M. S. REEDER.